United States Patent
Hu

(10) Patent No.: US 9,530,183 B1
(45) Date of Patent: Dec. 27, 2016

(54) ELASTIC NAVIGATION FOR FIXED LAYOUT CONTENT

(71) Applicant: Amazon Technologies, Inc., Reno, NV (US)

(72) Inventor: Hao Hu, Belmont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 142 days.

(21) Appl. No.: 14/199,771

(22) Filed: Mar. 6, 2014

(51) Int. Cl.
*G06T 3/40* (2006.01)
*G06F 3/0484* (2013.01)

(52) U.S. Cl.
CPC ............. *G06T 3/40* (2013.01); *G06F 3/04845* (2013.01)

(58) Field of Classification Search
CPC ....................................................... G06T 3/40
See application file for complete search history.

(56) References Cited

U.S. PATENT DOCUMENTS

| | | | |
|---|---|---|---|
| 2009/0010567 A1* | 1/2009 | Akiba | B60R 1/00 382/298 |
| 2011/0099512 A1* | 4/2011 | Jeong | G06F 3/0481 715/790 |
| 2013/0326341 A1* | 12/2013 | Nonaka | G06T 11/60 715/246 |
| 2014/0002502 A1* | 1/2014 | Han | G06T 11/60 345/646 |
| 2014/0115534 A1* | 4/2014 | Yuan | G06F 3/0482 715/800 |
| 2015/0235344 A1* | 8/2015 | Chi | G06T 5/50 345/634 |

* cited by examiner

*Primary Examiner* — Joni Richer
*Assistant Examiner* — Grace Q Li
(74) *Attorney, Agent, or Firm* — Weaver Austin Villeneuve & Sampson LLP

(57) ABSTRACT

Techniques are described for presenting fixed layout content in which different scaling factors are used for different portions of an original image such that a user viewing the content on a smaller screen can selectively enlarge different portions of the image while still being able to see all the content in the original page or portion of the surrounding context.

14 Claims, 6 Drawing Sheets

ELASTIC NAVIGATION FOR FIXED LAYOUT CONTENT

BACKGROUND

Consumers have a wide variety of channels and devices by which they may acquire and experience various types of content. Some types of visual content are readily adapted to the screen sizes of different types of devices. For example, video and photographs are easily scaled for viewing on smart phone screens, tablet screens, laptop screens, etc. Most such devices also allow the user to zoom in and out of a displayed image. Literary content in the form of text may also be easily adjusted to different screen sizes by, for example, adjusting the font size of the text and/or the number of words displayed on a page. However, some types of content do not scale well to the screens of smaller devices, resulting in a user experience that could be improved.

One example of such content is Manga, a popular form of comic books and graphic novels originating in Japan. The traditional format for Manga presents a collection of drawing panels of different shapes and sizes (some with associated text) on a page. The reader is intended to follow the illustrated story by progressing sequentially through the panels; generally speaking, from the upper right hand corner to the lower left hand corner of the page. And while each panel may be considered in isolation, it is important to understand that the arrangement, flow and interrelatedness of the individual panels on a page form a context that is important to the reader's experience. For this reason, conventional image scaling techniques are not well suited for adapting Manga to different screen sizes; particularly for smaller devices.

For example, an original Manga publication might be a paperback book in which the panels of a page are presented in a 5×7.25 inch area on a page. When this is scaled for viewing on the screen of a smart phone (e.g., 2×3.5 inch) the resulting size of the text on the page may be difficult to see. This may be addressed using conventional zooming techniques. However, when the reader zooms in on a particular area, this results in the loss of the surrounding context. This is problematic where, as is often the case, the context is required in order that the reader understand the intended sequence of the panels. And even if the reader were to successfully navigate the sequence of panels by panning around the zoomed page, conventional solutions typically require the reader to zoom back out to the complete page view before the reader can advance to the next page; at which point the reader would have to zoom back in again.

DETAILED DESCRIPTION

This disclosure describes techniques for presenting fixed layout content in which different scaling factors are used for different portions of an original image such that a user viewing the content can selectively enlarge different portions of the image relative to other portions of the image while still being able to see the surrounding context. For example, a Manga enthusiast might download a volume of his favorite Manga series to his smart phone. As can be seen in interface 102 of FIG. 1, because the displayed page was originally intended to be viewed in a larger format, the detail in the page (particularly the text) may be difficult to see on the relatively small screen of the user's device when the entire page is displayed.

Figure 1:
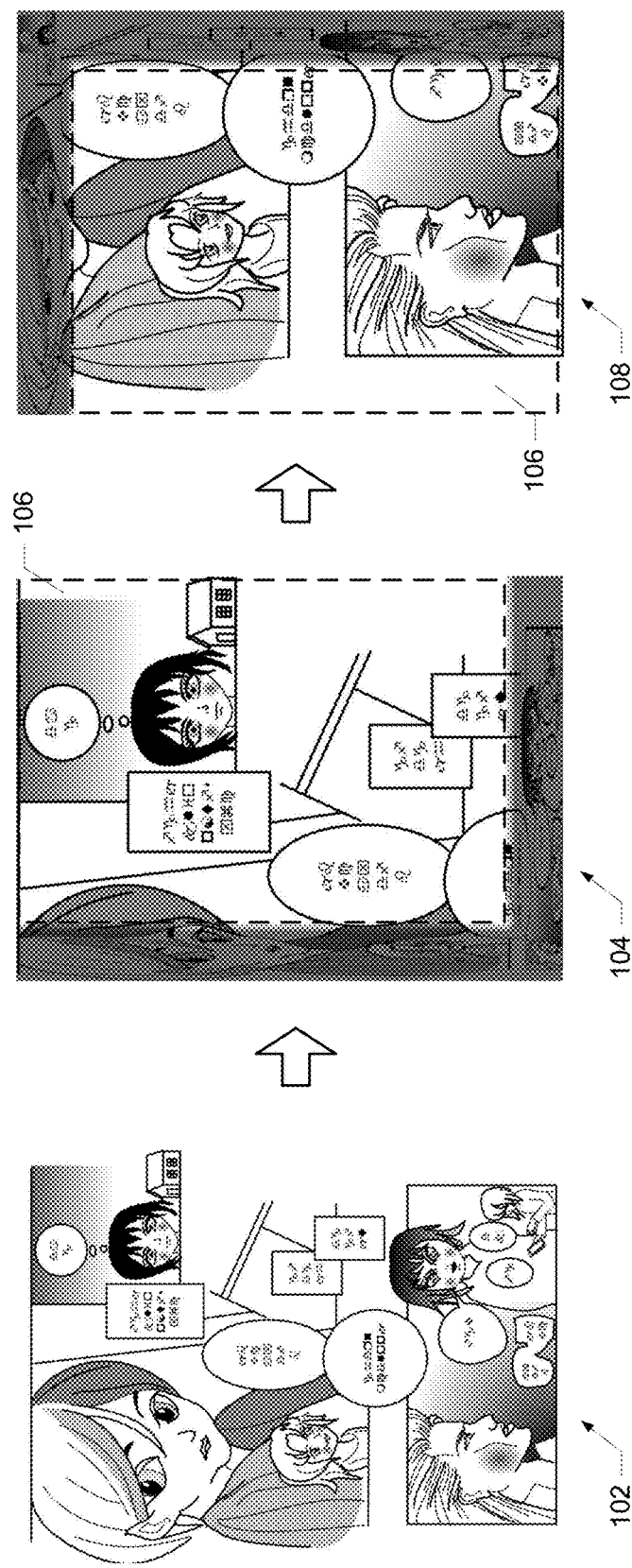
FIG. 1 illustrates a sequence of images rendered in accordance with a particular implementation.

To address this, an enhanced viewing mode illustrated in interface 104 of FIG. 1 provides a viewing area 106 in which a portion of the displayed image is scaled using a higher scaling factor than the remainder of the image. The scaling factor for the viewing area might be selected to display the portion of the image at substantially the same scale as the original image, e.g., the scale of a Manga page as it appears in the original hard copy publication. As can be seen, the text and drawing details in viewing area 106 are much easier to discern relative to the view of interface 102. In the depicted example, viewing area 106 is also shown highlighted relative to the rest of the image (e.g., by shading, dimming and/or otherwise deemphasizing the lower scaled portions of the image) to make it visually discernable which portion of the image is currently selected. And while the portions of the image outside of viewing area 106 may be somewhat obscured or distorted, the user is still able to see and appreciate the surrounding context and its relation to the portion of the image on which viewing area 106 is currently focused.

Preservation of the context of the image around viewing area 106 allows the user to navigate easily to another portion of the displayed page by, for example, dragging the viewing area to the desired location, or by touching or tapping the display, resulting in a reorientation of the viewing area. This is illustrated in interfaces 104 and 108 of FIG. 1 in which viewing area 106 is shown in the upper-right and lower-left-hand corners of the interfaces, respectively. The reorientation of the viewing area from one location to another may be presented with continuous animation in which the viewing area appears to move across the display with the underlying image appearing to flow in and out of the enlarged view. Specific implementations and various alternatives are described below.

Fixed layout content includes any visual content that may be displayed as an image and has an overall visual context that is relevant to the various portions or components of the image. The layout of the content is fixed in that it cannot easily be modified without breaking the connection between the overall context and the various components or otherwise detracting from the intent of the artist or publisher. Such content is often presented as a sequence of real or virtual pages, each of which represents a distinct context and is intended to be viewed as a whole. As discussed above, Manga and other types of comics and graphic novels are good examples of fixed layout content. However, despite references to implementations that may be optimized or intended for display of such content, the present invention is not so limited. That is, the present invention may be employed with any type of image where it is useful or desirable to maintain some or all of a larger context while providing the ability to clearly focus on particular areas. For example, implementations of the present invention may be optimized for viewing large format images or drawings such as blueprints or maps. Further, the scope of the invention is not limited to any particular image format, device, or display type. Any type of digital image (e.g., .jpg, .gif, .pdf, .tiff, etc.) that may be rendered and displayed on the display of an electronic device may potentially benefit from the techniques described herein.

Figure 2:
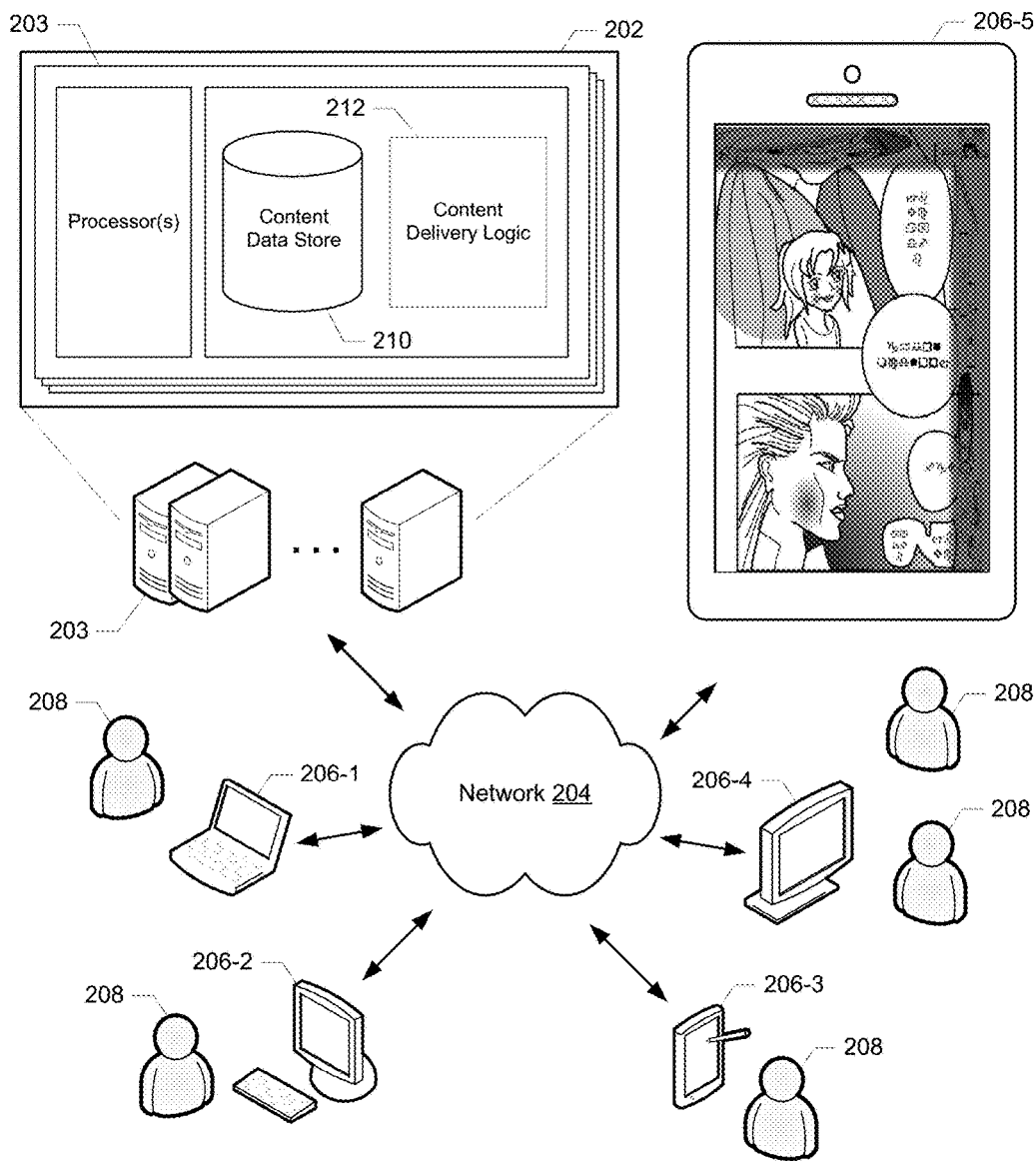
FIG. 2 is a simplified diagram of a computing and network environment in which embodiments of the present invention may be implemented.

FIG. 2 illustrates an example of a computing environment in which fixed layout content may be delivered by a content service 202 via network 204 to a variety of client devices (206-1 through 206-5) associated with users 208. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 206 may be any suitable devices capable of connecting to network 204 and consuming services and viewing content provided by content service 202. Such device may include, for example, mobile devices (e.g., cell phones, smart phones, and tablets), personal computers (e.g., laptops and desktops), set top boxes (e.g., for cable and satellite systems), smart televisions, gaming consoles, etc. Content service 202 includes a data store 210 in which the content delivered to client devices is stored, and content delivery logic 212 which facilitates the delivery of the content to the client devices.

It should be noted that the computer program instructions on which various implementations are based may correspond to any of a wide variety of programming languages, software tools and data formats, and be stored in any type of non-transitory computer-readable storage media or memory device(s), and may be executed according to a variety of computing models including, for example, on any kind of stand-alone computing device, or according to a client/server model, a peer-to-peer model, or a distributed computing model in which various functionalities may be effected or employed at different locations. For example, the code that enables the enhanced viewing modes described herein might be native on the client device (e.g., as part of display controller logic), downloaded to the client device as an application, fully or partially hosted on a platform remote from a thin client (e.g., service platform 202 or a third party platform), etc. Any suitable alternatives known to those of skill in the art may be employed.

According to a particular class of implementations, an enhanced viewing mode for fixed layout content is provided on an electronic device having a relatively small form factor (e.g., 2×3.5 inch or 3.5×4.75 inch) as compared to the page size of a traditional Manga publication (e.g., 5×7.25 inch or 6×8.25 inch) such as, for example, a smart phone or a small tablet device. The techniques described herein are particularly well suited for applications in which the page size of the original content is larger than the screen of the target device. Ideally the original page size should not be too large compared with the available screen area of the target device for which it is being scaled so that the content outside of the viewing area remains recognizable, e.g., so the user can see where the user wants to navigate.

Figure 3:
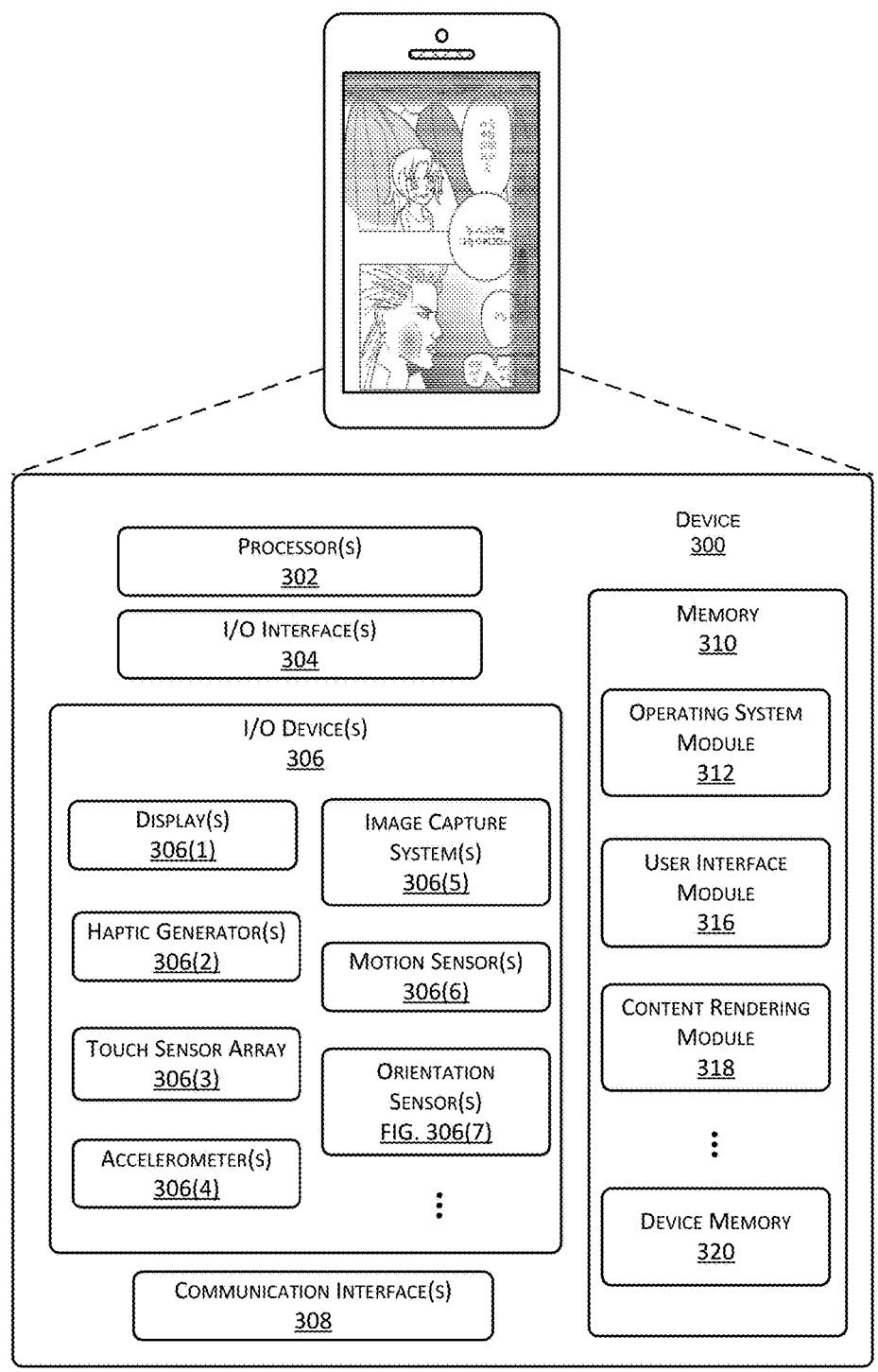
FIG. 3 is a simplified block diagram of an example of an electronic device which may be used with particular implementations.

A block diagram of an example of such an electronic device 300 is shown in FIG. 3. Device 300 includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306. The I/O device(s) 306 may include one or more displays 306(1), one or more haptic generators 306(2), a touch sensor array 306(3), one or more accelerometers 306(4), one or more image capture systems 306(5), one or more motion sensors 306(6), one or more orientation sensors 306(7), microphones, speakers, and so forth. The one or more displays 306(1) are configured to provide visual output to the user and may comprise any of a variety of display types including, for example, any type of reflective or transmissive display. Touch sensor array 306(3) may be a capacitive sensor array having a matrix of conductors that are scanned to determine, for example, the location, duration, speed and direction of touch events within the matrix based on changes in electrical capacitance.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules.

User interface module 316 is configured to present a user interface to the user that may include visual, audible, and/or haptic components. For example, user interface module 316 may be configured to present, in conjunction with content rendering module 318, an image on display 306(1) in a normal viewing mode as well as an enhanced viewing mode as described herein. User interface module 316 may also be configured to process inputs of applied forces (e.g., touch events, swipes, etc.) at particular locations on the display to take particular actions such as, for example, paging forward or backward through paged content, zooming in and out, panning, entering and exiting the enhanced viewing mode, moving the viewing area in the enhanced viewing mode, etc. For example, user interface module 316 might interpret a single touch event on the display as a command to center the enhanced viewing area on a different portion of a displayed page of a Manga publication. By contrast, a swipe might be interpreted as a command to advance to the next page of the publication. Rendering module 318 is configured to process image data for presentation on display 306(1) both conventionally and in accordance with implementations of the enhanced viewing mode described herein.

Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of fixed layout content. In some implementations, a portion of device memory 320 may be distributed across one or more other devices including servers, network attached storage devices, and so forth.

As mentioned above, the computer program instructions used to provide an enhanced viewing mode as described herein may be implemented in a variety of ways. For example, they could be part of the native display controller logic of device 300. Alternatively, they could be implemented as a separate application (from the content provider, a device provider, or any other third party) that may be downloaded to the device. In another alternative, where device 300 is a thin client, at least some of the instructions may be hosted on a remote platform. Suitable alternatives will be apparent to those of skill in the art. It will also be understood that device 300 of FIG. 3 is merely an example of a device with which various implementations of the present invention may be practiced, and that a wide variety of other devices types may also be used. The scope of the invention should therefore not be limited by reference to device-specific details discussed above.

Figure 4:
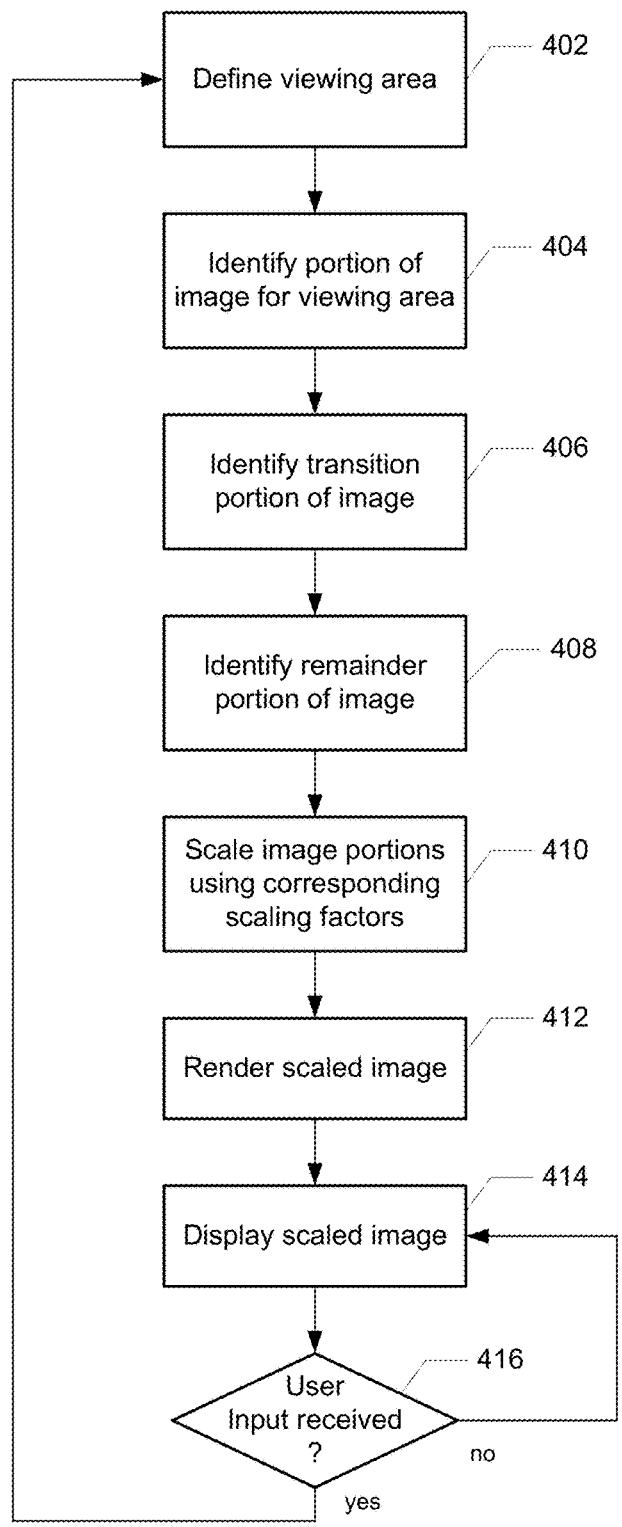
FIG. 4 is a flowchart illustrating operation of a particular implementation.

Presentation of an image on the display of an electronic device according to a particular implementation is illustrated in the flow chart of FIG. 4. When the enhanced viewing mode is invoked or initiated, a viewing area for presentation within the screen area of the device is defined (402). At run time, this might correspond to a fixed size and shape which may or may not be configurable by the end user, e.g., via editing of a configuration file or via a configuration menu. According to a particular implementation, the size and shape of the viewing area may be automatically determined (at least initially) with reference to the display size of the electronic device and/or the nature of the content being rendered. The initial location of the viewing area might also be automatically selected, e.g., the upper right hand corner of the display for a Manga publication, or may be selected in response to user input, e.g., centered at a particular point of the image as determined by a touch event on the display.

The viewing area may be specified as a percentage of available screen area, an aspect ratio, one or more dimensions (e.g., height and width or area in inches, centimeters, or display pixels, etc.), or any combination of such parameters. As will be understood, the shape, size and location of the viewing area will correspond to a particular set of display pixels. It should be noted that, as will be discussed below, implementations are also contemplated in which the size and shape of the viewing area may be dynamically determined at run time, e.g., as the user is navigating the displayed page.

The enhanced viewing mode may be initiated or invoked in a wide variety of ways. For example, the enhanced viewing mode might be enabled automatically upon detection or identification of certain types of content (e.g., fixed layout content) and/or certain conditions (e.g., where the original image is larger than the available screen area; as potentially determined from the scaling factor conventionally calculated to fit the image on the screen). The viewing mode might start automatically, e.g., as the content is initially rendered, or be triggered by user input such as, for example, a touch event on a conventionally displayed image, or the user responding to a pop-up window providing the option of entering the enhanced viewing mode. The user may also be given an option to opt out of the enhanced viewing mode (e.g., by selection of an interface control) or to switch between the enhanced viewing mode and a conventional viewing mode (e.g., by tapping the display or some other action).

Referring back to FIG. 4, the portion of the original image that corresponds to the viewing area is identified (404). This may be accomplished with reference to a predetermined or previously specified scaling factor for the viewing area relative to the size of the original image. For example, for a viewing area scaling factor of 100% there would be a one-to-one correspondence of image pixels to display pixels. Alternatively, for a viewing area scaling factor of 150% there would be a two-to-three correspondence of image pixels to display pixels, and so on. Thus, for a given location of the viewing area within the screen area of the display, the portion of the image to be presented in the viewing area may be identified, for example, by mapping a particular image pixel to a particular display pixel (e.g., the upper right hand corner of the image and the upper right hand corner of the display) and using the scaling factor to determine how many of the original image pixels must "fit" into the display pixels of the viewing area.

As with the size and shape of the viewing area, the scaling factor associated with the viewing area may or may not be configurable by the user. According to some implementations, the scaling factor may be fixed. According to others, it may be automatically selected (at least initially) based on the display size and/or the nature of the content being rendered (e.g., the original image size). The user may be given the opportunity to specify or modify the viewing area scaling factor (e.g., by editing a configuration file or navigating a configuration menu). This may be a static configuration (i.e., not configurable at run time) or, as will be discussed, may be enabled dynamically during operation of the enhanced viewing mode.

Figure 5:
FIG. 5 is a view of a portion of an image rendered in accordance with a particular implementation.

Referring again to FIG. 4, a transition portion of the original image outside of the viewing area is identified (406). This transition portion of the image is scaled to provide a gradual transition between the image displayed in the viewing area at one scale and the rest of the image displayed outside of the viewing area at another. As will be discussed, this is achieved using one or more intermediate scaling factors between the scaling factors associated with these two display areas. As will be appreciated, this transition area may help the user to better appreciate the connection between the portion of the image in the viewing area and the surrounding context, and may also serve to ameliorate or eliminate the abruptness of the transition from one scale to the other; an effect that might otherwise be visually unpleasant to the user. An example, of how such a transition area might appear is shown in FIG. 5 in which a portion of interface 108 of FIG. 1 is enlarged to show continuity of the image in the viewing area with the remainder of the image outside of the viewing area. According to some implementations, some parameters associated with the transition area may be configurable by the user, e.g., the width of the transition area, the associated scaling factor(s), etc.

The transition portion of the image may be identified in a variety of ways depending on the implementation and/or the location of the viewing area. For example, the transition portion of the image might be defined with reference to a previously specified portion of the screen area reserved for the transition area in which this scale transition takes place. For example, this could be specified as a percentage of the total screen area (e.g., 1-5%), by a specifying a width of display pixels around the perimeter of the viewing area, etc. And as with the viewing area, once the set of display pixels corresponding to the transition area on the display is defined, the image pixels may be identified using the scaling factor(s) associated with the transition area. That is, for a given scaling factor associated with the transition area, the image pixels to be mapped to the display pixels can be determined. Alternatively, the transition portion of the image might be defined with reference to the original image itself. For example, a width of the image around the edge of the portion of the image to be presented in the viewing area could be specified (e.g., as a number or percentage of image pixels).

According to a particular implementation, the transition area is divided into multiple regions that may be defined, for example, by some measure of distance from the edge of the viewing area. According to one implementation, each region in the transition area has a corresponding scaling factor that is a fixed percentage of the scaling factor associated with the viewing area, and that decreases with distance from the viewing area. For example, if the viewing area scaling factor is 150%, the scaling factor for the first region of the transition area immediately adjacent the viewing area might be 0.9×150%; for the second region adjacent the first, 0.8×150%, and so on. As will be discussed and according to a particular implementation, outside of the transition area, a single scaling factor may be determined or specified that allows for display of the context surrounding the portion of the image in the viewing area; which in some cases may mean fitting all of the original image in the screen area of the target device.

Referring back to FIG. 4, a remainder portion of the image outside of the viewing area and the transition area is identified (408). That is, in some cases some or all of the image outside of the portions of the image to be displayed in the viewing and transition areas is to be displayed at a much lower scaling factor than the viewing area so as to provide a context for the portion of the image displayed in the viewing area. As may be appreciated, this may or may not need to be done as a separate step. For example, if the entire original image is to be rendered and displayed in the available screen area of the display, identification of the portions of the image corresponding to the viewing and transition areas may mean that any remaining portion(s) of the image constitutes such a remainder portion of the image. This remainder portion of the image may then be scaled by determining a scaling factor that "fits" the remaining image pixels into the remaining available display pixels.

Alternatively, the transition portion of the image may encompass the rest of the image to be displayed. That is, implementations are contemplated in which all of the screen area outside of the viewing area can be considered to be a transition area in which multiple scaling factors are employed to gradually scale down the image with distance from the edge of the viewing area. The scaling factors necessary to accomplish the desired transition may be a linear or nonlinear progression, the number and magnitudes of which may be determined such that the remaining image pixels to be displayed "fit" into the remaining display pixels.

It should be noted that implementations are contemplated in which not all of the remaining portion of the image is displayed. For example, where rendering and display of the entire image would result in the portions of the image being too small for a user to discern, some lesser portion of the image might be selected as the remainder portion so as to preserve context while still enabling the user to adequately perceive that context. This might be effected, for example, by enforcing a lower limit on the scaling factor to be applied to the portion(s) of the image outside of the viewing area. In such a case, this limit might then be used to determine how many of the remaining image pixels can be fit into the remaining display pixels which, in turn might result in some of the remaining portion of the image not being presented on the display.

It should also be noted that references to display of "all" of an original image in connection with some implementations should not be used to limit the scope of the invention. Such references are intended to indicate that the overall visual context of the original image is substantially preserved rather than that each and every component of an image is displayed. For example, implementations are contemplated in which portions of an image outside of a viewing area might be compressed to such an extent that information is lost and/or some components of the original image or not discernible. In another example, "white space" around the edge of an original image that does not include components of the image might be omitted or cropped in a displayed image. Other variations will be apparent to those of skill in the art.

Once the various portions of the image are identified, the image data for each portion is scaled for rendering using its corresponding scaling factor (410). As will be understood, conventional image scaling typically scales an image to be displayed in one direction (e.g., horizontal) and then the other (e.g., vertical). And when an image is being rendered conventionally, a fixed scaling factor is typically determined for each direction using the original image size and the display area in which the image is to be displayed. Pixels of an original image are then mapped to pixels of the display to fit the image or a selected portion of the image into the screen area of the target device.

By contrast and according to various implementations of the invention, different scaling factors are used to scale the horizontal and vertical dimensions of the different portions of the image for presentation on the display with the scaling factors for the viewing and transition areas being determined or specified as discussed above. And also as discussed above, some or all of the remaining portion of the original image may be scaled to fit in the remaining screen area outside of the viewing and transition areas. As will be appreciated, the horizontal and vertical scaling factors for each portion of the original image may be the same value (e.g., where a faithful reproduction of the original image is desired or important). As such, and in the interest of clarity, most of the description herein refers to one scaling factor for each portion of the image. However, it should be noted that implementations are contemplated in which the horizontal and vertical scaling factors for each image portion may differ. It will also be understood that the scope of the present invention is not limited by reference to scaling factors as a percentage of an original image size. Rather, it will be understood that scaling factors may be expressed in a number of different ways without departing from the scope of the invention. For example, a scaling factor may be expressed as a ratio of image pixels of an original image to display pixels; and this ratio may differ for horizontal and vertical dimensions. And for scaling factors expressed as a percentage of the size of an original image, these may refer to a single factor applied to an area of the image, or individual factors for the horizontal and vertical dimensions. It should be noted that other ways of expressing scaling factors are contemplated and that these examples are not intended to limit the scope of the invention.

Once the various portions of the image are identified and the corresponding scaling factors retrieved or determined, the image is then rendered (e.g., by content rendering module 318 of FIG. 3) in accordance with the different scaling factors to map the various image pixels of the original image to the display pixels (412). The rendered image is then displayed on the display of the electronic device (414) (e.g., by user interface module 316 of FIG. 3). As will be appreciated, the rendering and display of the image may be accomplished in one step or multiple steps. For example, rendering of the scaled image may result directly in display of the image. Alternatively, rendering of the scaled image may involve placement of the scaled image in a display buffer where it is subsequently presented on the display.

When input is received representing interaction of the user with the displayed image (416), e.g., the user is attempting to navigate around the image, the process repeats to present a different portion of the image in the viewing area. According to various implementations, the user is enabled to move the viewing area around the display, either in a continuous manner (e.g., by dragging it around the screen or with a panning gesture or swiping motion), or by touching or tapping anywhere on the displayed image with the result that the viewing area is automatically centered on or otherwise moved to include that location. The move to the new location may be continuous, e.g., appearing to the user as a kind of animation in which the distorted portion of the image outside of the viewing area "flows" into the viewing area. Alternatively, the viewing area may "jump" to the new location more abruptly.

According to some implementations, movement of the viewing area might also be controlled using other types of input. For example, eye-tracking software (e.g., using input from image capture system 306(5) of FIG. 3) might be used to center or move the viewing area to include a particular location of the image on which the user is focusing. In other examples, other types of body movements of a user (e.g., head, face, hand, finger, etc.) may be tracked (e.g., using image capture input) to center or move the viewing area. Such tracking systems might be completely integrated with the device, or be partially or entirely separate from the device. Alternatively, sensors that detect spatial movement of the device, e.g., tilting or shaking, might be used (possibly in combination with other input) to move the viewing area in a direction of a tilt or a shake of the device. Such implementations might use input from, for example, accelerometer(s) 306(4), motion sensor(s) 306(6), and orientation sensor(s) 306(7) of FIG. 3.

As mentioned above and according to some implementations, the user may be able to modify certain parameters that control various aspects of the operation of the enhanced viewing mode. For example, the user may be able to modify the size of the viewing area, the scaling factor of the viewing area, the scaling factor of the area(s) outside of the viewing area, the degree of shading of the area(s) outside of the viewing area, etc. Modifications to such parameters may be enabled using mechanisms outside of the operation of the enhanced viewing mode. For example, the user may be able to edit a configuration file associated with the enhanced viewing mode code that specifies one or more of these parameters. A user might also be provided with a settings menu with which such parameters may be modified.

Alternatively, implementations are contemplated in which the user may be able to modify some parameters in real time while the enhanced viewing mode is operating. For example, the scaling factor in the viewing area might be modified by the user executing a pinch zoom motion or multiple taps within that area. In another example, the size and/or shape of the viewing area might be modified by dragging an edge or a corner of the viewing area.

According to a particular class of implementations, the size and/or shape of the viewing area may be adjusted automatically and dynamically in response to characteristics of the image being displayed, e.g., detection of a corresponding component, object, or panel within the image. For example, some Manga or graphic novels have illustration panels of different sizes and shapes on a page. The edges of at least some panels of the original image might be detectable, e.g., as solid, bold lines or curves. When a user selects a particular location on a display page and that location is determined to be within a panel having a well-defined boundary, that portion of the image can be scaled to fill the viewing area. This may be achieved with a fixed scaling factor which would result in conforming the size and shape of the viewing area to the particular panel. Alternatively, if the size and shape of the viewing area is fixed, the scaling factor for the viewing region could be dynamically adjusted to conform the panel to the viewing area.

According to some implementations, the original image could be enhanced to promote this feature. For example, visible or invisible boundaries might be included in the image data that serve to distinguish different components, objects, or panels from each other. Alternatively, individual image pixels or groups of image pixels could be tagged to indicate that they belong to a conceptually separate component, object, or panel. Such image enhancement could also be leveraged to provide additional functionality. For example, where individual components, objects, or panels of an image or detectable or identifiable, the user might be enabled to navigate an image in a predetermined manner, e.g., if the panels on a page are identifiable and sequenced, the user might simply tap the screen to advance from one panel to the next in the sequence in a manner analogous to advancing pages in an e-book.

According to a particular class of implementations and as shown, for example, in FIGS. 1 and 5, shading is applied to the portions of the image outside of the viewing area to more clearly identify the viewing area for the user. And to avoid an abrupt transition between the relatively bright viewing area and the darker region outside of the viewing area, this shading may be applied in a gradual manner. For example, each of the regions of the transition area might have a progressively darker shade applied so that the transition from the viewing area is more subtle.

As discussed above, the mapping of original image pixels to display pixels uses different scaling factors for different portions of the image with the mapping of image pixels to the viewing area being defined initially by the initial location of the viewing area and then redefined each time the viewing area is moved, either by a displacement corresponding to a swipe or drag by the user, or by a location on the original image defined by a touch location on the displayed image. According to some implementations, where the viewing area is close to the edge of the screen the transition area might be reduced or even eliminated. For example, if the viewing area is at the edge of the screen area, there would be no transition or remainder areas on that side of the viewing area. And where the viewing area is sufficiently close to the edge of the screen area, any remaining screen area on that side of the viewing area might use only the scaling factor associated with the remainder area given that the sharpness of the transition may not be visible to the user under that condition.

For example, if there are only 5 display pixels between the edge of the viewing area and the edge of the screen area, 10 display pixels of transition area obviously cannot be accommodated. In such a case, various options may be employed. For example, if the size of the transition area is fixed at ⅕ of the total screen area outside of the viewing area, one of the 5 pixels could be the transition area with the remaining 4 pixels being the remainder area. Alternatively, the first 4 pixels could have descending scaling factors with the 5$^{th}$ pixel using the scaling factor of the remainder area. In yet another alternative, each successive region of the transition area could be defined as being two pixels wide such that the first two of the 5 pixels would have one scaling factor and the second two another. The final pixel could then use a third intermediate scaling factor or, because it is not two pixels wide, use the scaling factor of the remainder area. Other alternatives will be apparent to those of skill in the art.

Figure 6:
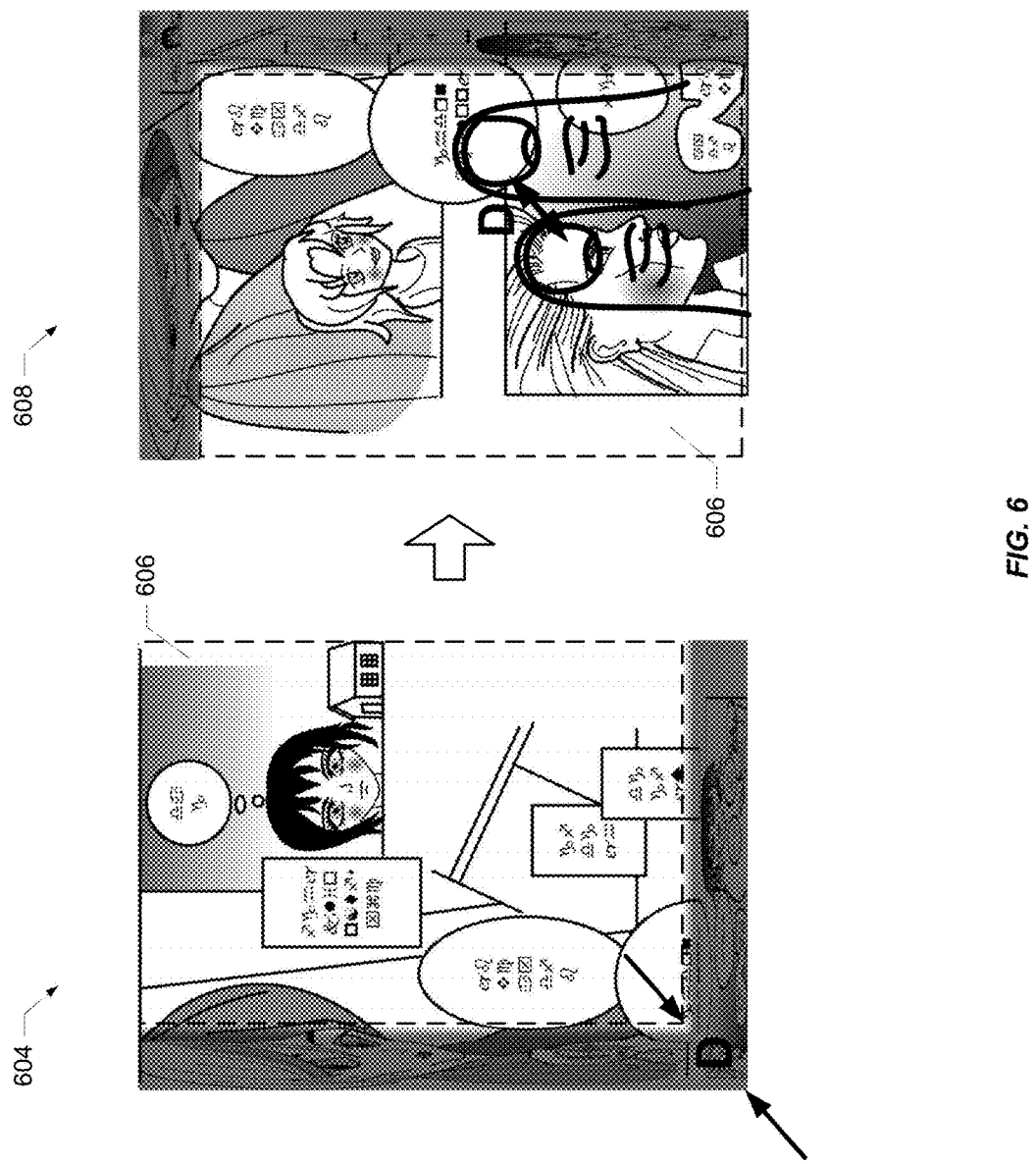
FIG. 6 illustrates another sequence of images rendered in accordance with a particular implementation.

As will be appreciated with reference to the foregoing, implementations as described herein may be characterized by one or more advantages. For example, enhanced viewing modes as described herein enable navigation of a large image with very small motions. That is, because the entire image may be presented on the display and the user can see other target areas of the image, the user can move the viewing area to any portion of the image with a single motion, e.g., a touch, a swipe, a drag, or even a glance. This is to be contrasted with conventional pinch/zoom and panning in which, depending on the zoom level, many swipes might be necessary to navigate to another portion of an image; particularly since the user cannot see the areas to which the user is panning. For implementations operating on devices having small form factors, e.g., smart phones, the user may be able to easily navigate around the entirety of even a very large image with one thumb of one hand. This may be understood with reference to FIG. 6.

An initial position of viewing area 606 is shown in the upper right hand corner of interface 604. As discussed above, use of a conventional zoom mechanism might result in a situation in which the user must pan several times to reach the lower left hand corner of the image; with each panning motion requiring movement (e.g., with a thumb or stylus) across much of the screen's height or width. However, because the entire context of the image, including the navigation destination, may be presented on the screen at once using the techniques described herein, the user may navigate to the lower left hand corner of the image with a single motion of his thumb; a motion that may only be required to cover the difference D in screen area between the initial position of the viewing area and the desired position of the viewing area. See interface 608 of FIG. 6.

In implementations in which entire pages of paged content are displayed, the user may readily advance to the next page without having to exit the enhanced viewing mode, e.g., using a swipe or a next page control. This eliminates the confusion or frustration users often experience when trying to advance to the next page while conventionally zoomed into an image.

Some implementations are intended to simulate as closely as possible the experience of the user in consuming the depicted content in its original publication format. For example, in a class of implementations optimized for presentation of Manga, the scaling factor associated with the viewing area may be selected so as to present the portion of the image in the viewing area at or near the scale of the original paperback publication. Such use of the original image scale as a kind of "golden standard" may result in a more satisfying user experience and may also be characterized by one or more performance advantages. For example, scaling of image data to larger or smaller scales may result in undesirable visual artifacts in the displayed image. However, if the image data represent the original image scale, a scaling factor of 100% (i.e., one image pixel to one display pixel) may be employed for the viewing area, thus more faithfully preserving the original image quality. This, in turn, may obviate the need for image processing overhead intended to address the kinds of artifacts that are caused by enlarging or shrinking an original image.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. For example, implementations have been described in which a gradual transition is achieved from the portion of the image displayed in the viewing area to the portion of the image displayed outside of the viewing area. However, implementations are contemplated in which this is either not done (e.g., one scaling factor in the viewing area transitions immediately to another scaling factor in the remainder area), or in which the smoothness of the transition may vary.

In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method for presenting an image representing fixed layout content on a display of an electronic device, the fixed layout content including a plurality of distinct components, the method comprising:
  using one or more processors of the electronic device, displaying the image on the display;
  with the one or more processors, receiving an indication that an enhanced viewing mode has been selected;
  using the one or more processors, selecting a first selected portion of the image that substantially conforms to a first one of the distinct components of the fixed layout content for presentation in a first viewing area of the display using a first scaling factor;
  automatically and dynamically determining a size and a shape of the first viewing area such that the first distinct component of the fixed layout content scaled using the first scaling factor substantially conforms to the first viewing area;
  using the one or more processors, selecting first selected image data corresponding to the first selected portion of the image;
  using the one or more processors, scaling the first selected image data using the first scaling factor;
  using the one or more processors, scaling first remaining image data corresponding to a first remaining portion of the image using one or more additional scaling factors for presentation of the first remaining portion of the image on the display outside of the first viewing area;

using the one or more processors, displaying the first selected portion and the first remaining portion on the display in accordance with the first scaling factor and the one or more additional scaling factors such that the first selected portion appears enlarged relative to the first remaining portion;

receiving, with the one or more processors, input representing a panning gesture by a user;

using the one or more processors, selecting a second selected portion of the image that substantially conforms to a second one of the distinct components of the fixed layout content;

using the one or more processors, selecting second selected image data corresponding to the second selected portion of the image for presentation in a second viewing area of the display using the first scaling factor;

automatically and dynamically determining a size and a shape of the second viewing area such that the second distinct component of the fixed layout content scaled using the first scaling factor substantially conforms to the second viewing area;

using the one or more processors, scaling the second selected image data using the first scaling factor;

using the one or more processors, scaling second remaining image data corresponding to a second remaining portion of the image using the one or more additional scaling factors for presentation of the second remaining portion of the image on the display outside of the second viewing area; and using the one or more processors, displaying the second selected portion and the second remaining portion on the display in accordance with the first scaling factor and the one or more additional scaling factors such that the second selected portion appears enlarged relative to the second remaining portion.

2. The method of claim 1, wherein the one or more additional scaling factors comprise a plurality of additional scaling factors and wherein scaling the first remaining image data includes scaling portions of the first remaining image data representing different distances from an edge of the first selected portion of the image with different ones of the additional scaling factors.

3. The method of claim 1, further comprising dimming the first remaining portion relative to the first selected portion such that the first selected portion appears highlighted on the display relative to the first remaining portion.

4. An electronic device, comprising:
a display;
one or more memories having image data stored therein, the image data representing an image representing fixed layout content, the fixed layout content including a plurality of distinct components; and
one or more processors configured to:
select a first selected portion of the image that substantially conforms to a first one of the distinct components of the fixed layout content for presentation in a first viewing area of the display using a first scaling factor;
automatically and dynamically determine a size and a shape of the first viewing area such that the first distinct component of the fixed layout content scaled using the first scaling factor substantially conforms to the first viewing area;

scale first selected image data corresponding to the first selected portion of the image using the first scaling factor;

scale first remaining image data corresponding to a first remaining portion of the image using a second scaling factor for display of the first remaining portion of the image outside of the first viewing area;

display the image on the display in accordance with the first scaling factor and the second scaling factor such that the first selected portion appears enlarged relative to the first remaining portion;

select a second selected portion of the image that substantially conforms to a second one of the distinct components of the fixed layout content for presentation in a second viewing area of the display using the first scaling factor;

automatically and dynamically determine a size and a shape of the second viewing area such that the second distinct component of the fixed layout content scaled using the first scaling factor substantially conforms to the second viewing area;

scale second selected image data corresponding to the second selected portion of the image using the first scaling factor;

scale second remaining image data corresponding to a second remaining portion of the image using the second scaling factor for display of the second remaining portion of the image outside of the second viewing area; and display the image on the display in accordance with the first scaling factor and the second scaling factors such that the second selected portion appears enlarged relative to the second remaining portion.

5. The electronic device of claim 4, wherein the one or more processors are further configured to select the second selected image data in response to input representing a touch event by a user.

6. The electronic device of claim 5, wherein the touch event corresponds to one of a swipe, drag, or other type of touch event on a touch screen of the electronic device, tilting of the electronic device, body movement captured by a tracking system, or activation of a viewing area control of the electronic device.

7. The electronic device of claim 4, wherein the second scaling factor is one of a plurality of additional scaling factors and wherein scaling the first remaining image data includes scaling portions of the first remaining image data representing different distances from an edge of the first selected portion of the image with different ones of the additional scaling factors.

8. The electronic device of claim 4, wherein the one or more processors are configured to display the image by highlighting the first selected portion relative to the first remaining portion.

9. The electronic device of claim 4, wherein the one or more processors are further configured to enable a user to modify one or more of the first scaling factor, the second scaling factor, or at least one dimension of the first viewing area.

10. A computer program product, comprising one or more non-transitory computer-readable media having computer program instructions stored therein, the computer program instructions being configured such that, when executed by one or more computing devices, the computer program instructions cause the one or more computing devices to:

select an image representing fixed layout content for display on a display of an electronic device, the fixed layout content including a plurality of distinct components;

select a first selected portion of the image that substantially conforms to a first one of the distinct components of the fixed layout content for presentation in a first viewing area of the display using a first scaling factor;

automatically and dynamically determine a size and a shape of the first viewing area such that the first distinct component of the fixed layout content scaled using the first scaling factor substantially conforms to the first viewing area;

scale first selected image data corresponding to the first selected portion of the image using the first scaling factor;

scale first remaining image data corresponding to a first remaining portion of the image using a second scaling factor for display of the first remaining portion of the image outside of the first viewing area;

display the image on the display in accordance with the first and second scaling factors such that the first selected portion appears enlarged relative to the first remaining portion;

select a second selected portion of the image that substantially conforms to a second one of the distinct components of the fixed layout content for presentation in a second viewing area of the display using the first scaling factor;

automatically and dynamically determine a size and a shape of the second viewing area such that the second distinct component of the fixed layout content scaled using the first scaling factor substantially conforms to the second viewing area;

scale second selected image data corresponding to the second selected portion of the image using the first scaling factor;

scale second remaining image data corresponding to a second remaining portion of the image using the second scaling factor for display of the second remaining portion of the image outside of the second viewing area; and display the image on the display in accordance with the first scaling factor and the second scaling factors such that the second selected portion appears enlarged relative to the second remaining portion.

11. The computer program product of claim 10, wherein the computer program instructions are further configured to cause the one or more computing devices to select the second selected image data in response to input representing a touch event by a user.

12. The computer program product of claim 10, wherein the second scaling factor is one of a plurality of additional scaling factors and wherein scaling the first remaining image data includes scaling portions of the first remaining image data representing different distances from an edge of the first selected portion of the image with different ones of the additional scaling factors.

13. The computer program product of claim 10, wherein the computer program instructions are configured to cause the one or more computing devices to display the image by highlighting the first selected portion relative to the first remaining portion.

14. The computer program product of claim 10, wherein the computer program instructions are further configured to cause the one or more computing devices to enable a user to modify one or more of the first scaling factor, the second scaling factor, or at least one dimension of the first viewing area.

\* \* \* \* \*